(No Model.) 2 Sheets—Sheet 2.
S. T. AYRES.
MACHINE FOR PACKING FLOUR.
No. 397,411. Patented Feb. 5, 1889.
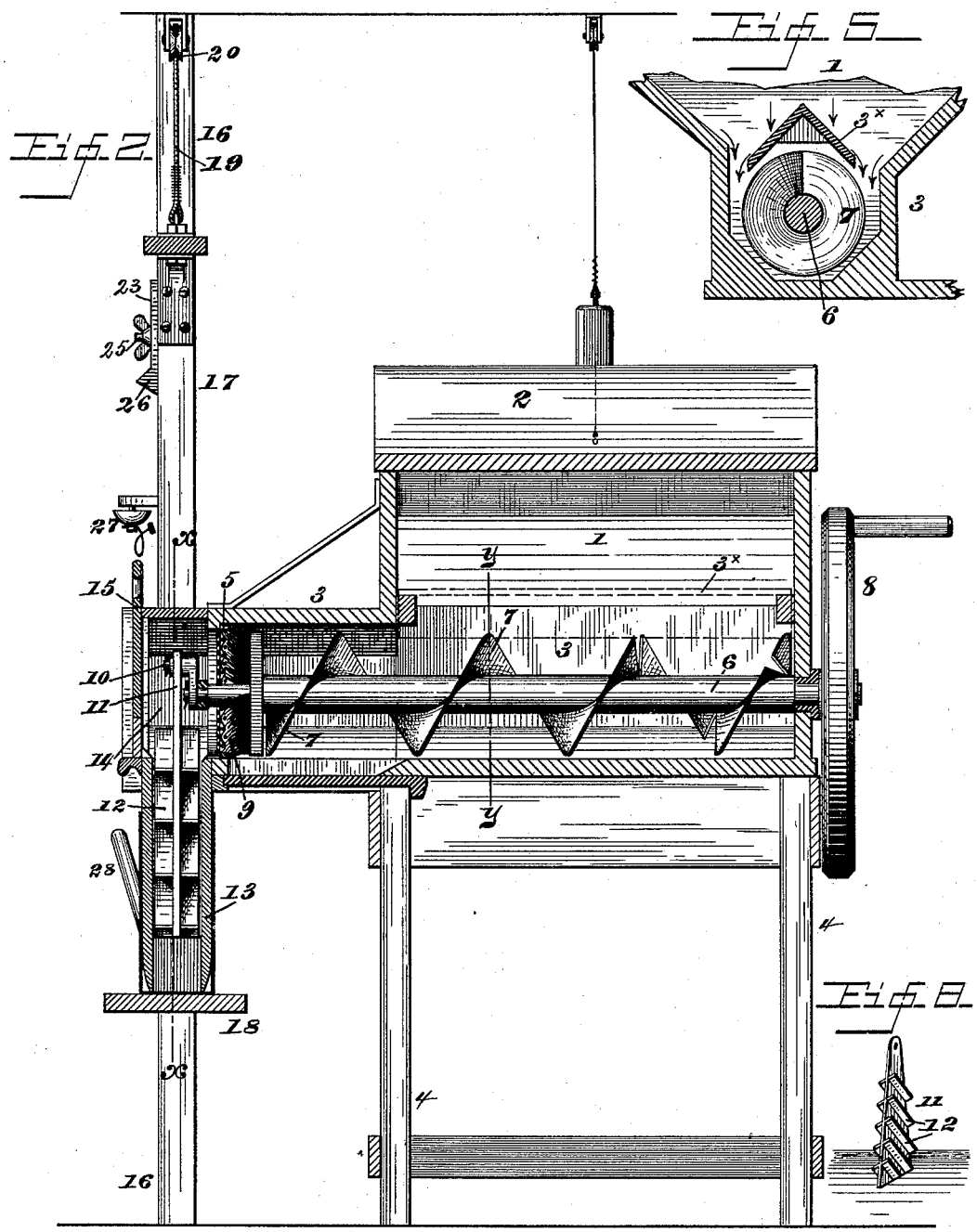

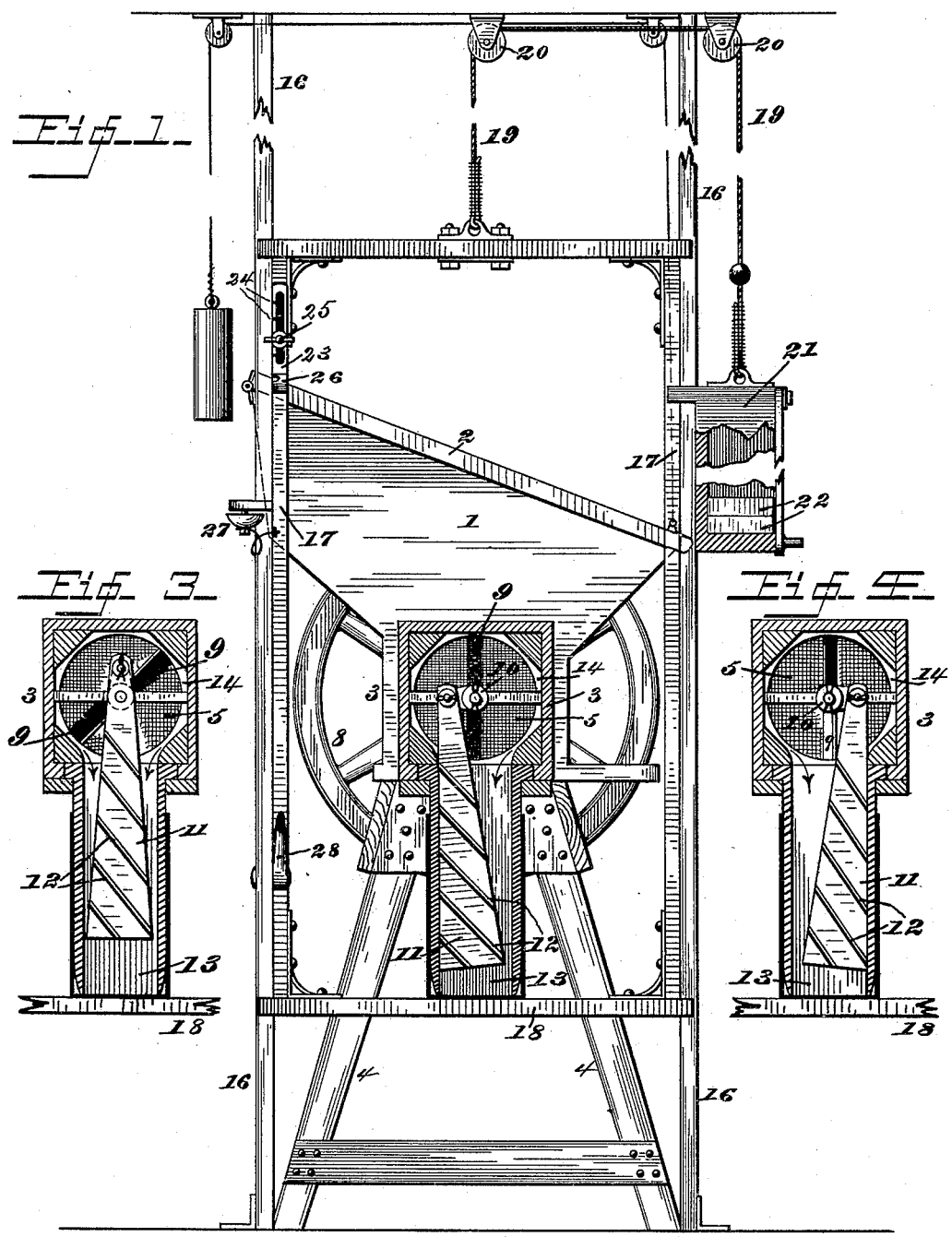

dimensions.
UNITED STATES PATENT OFFICE.

SAXTON TICE AYRES, OF PHILADELPHIA, PENNSYLVANIA.

MACHINE FOR PACKING FLOUR.

SPECIFICATION forming part of Letters Patent No. 397,411, dated February 5, 1889.

Application filed May 3, 1888. Serial No. 272,652. (No model.)

*To all whom it may concern:*

Be it known that I, SAXTON TICE AYRES, a citizen of the United States, residing in the city and county of Philadelphia, State of Pennsylvania, have invented a new and useful Improvement in Machines for Packing Flour, which improvement is fully set forth in the following specification and accompanying drawings.

My invention relates to improvements in machines for packing and filling sacks and barrels, and has especial relation to a machine for filling the same with flour, meal, buckwheat, and like material, which is very finely ground.

The object of the invention is to provide a machine of the character mentioned which will fill the receptacles rapidly, and thus save a great amount of time, which will sift the material and remove the foreign matter therefrom, which will have means for telling when the receptacle has been filled, and which is capable of filling receptacles of any desired dimensions.

A further object is to provide a machine which will be very simple and durable in construction, easy and effective of operation, and inexpensive of production.

The invention consists of the combination of parts, as hereinafter described, and set forth in the claims.

Figure 1 represents an end elevation, partly sectional, of a machine for packing flour embodying my invention. Fig. 2 represents a vertical longitudinal sectional view thereof. Figs. 3 and 4 represent vertical sectional views taken on line $x\ x$, Fig. 2, the parts being illustrated in different positions. Fig. 5 represents a vertical sectional view taken on line $y\ y$, Fig. 2. Figs. 6 and 7 represent perspective views of different-sized discharge-chutes. Fig. 8 represents a detail view of the packer.

Similar letters of reference indicate corresponding parts in the several figures.

Referring to the drawings, the numeral 1 represents the receiving receptacle or hopper, having the lid or cover 2, and 3 represents a conveyer-box communicating with the hopper, the said box and hopper being supported on legs 4. The conveyer-box 3 projects at its open end a short distance beyond the hopper, and in the said open end is secured a sifter or screen, 5. The said passage is preferably of the shape shown in Fig. 5 of the drawings, which causes the material to reach the conveyer with ease. I also provide the gable-shaped removable roof or guard $3^\times$ above the conveyer to prevent the material from bearing heavily on said conveyer.

6 represents a shaft passing through the conveyer-box and journaled in the closed end thereof and in a cross-piece at the other end. This shaft carries the spiral conveyer 7, which may be formed as a continuous screw; but I prefer to use a broken screw or a series of small blades arranged so as to provide a nearly-continuous screw. I find by experience that a conveyer formed of separate blade mixes the material better, and consequently facilitates the conveying of the same.

To the outer end of the shaft 6 is secured a power-wheel, 8, for revolving the conveyer, and near the inner end of the said shaft is secured a brush, 9, which rests at all times against the sifter or screen 5. The brush and the screen may be removed, if desired, and the material packed without being sifted.

To the inner end of the shaft 6 is attached a crank, 10, to which is connected the upper end of the packer 11. The packer consists of a bar or blade having inclined wings, vanes, or flights 12 on each side thereof. The packer or beater is arranged in the delivery or discharge chute 13, which depends from the chamber 14 and communicates therewith. The chamber 14 is provided with a slide or door, 15, by means of which access can be had to said chamber.

16 represents standards or uprights, in which the frame 17 works, and the bottom of said frame 17 provides a platform or support 18, on which the receptacles rest.

To the upper rail of the frame is connected one end of a rope or chain, 19, which passes over pulleys 20, and has the case or box 21 secured to its other end, and in said case or box are placed weights 22.

23 represents a slotted plate having a scale or graduated marks 24 thereon, and this slotted plate is carried by the frame, and is made adjustable thereon by means of the slot and screw 25, which works therein. This plate or "gage," as it may be more properly termed, is further provided with an extension or lug, 26, adapted to strike the clapper of the bell 27, secured to one of the standards.

In order to hold the frame at any desired point, I provide the friction-brake 28, which consists of a lever fulcrumed to one of the standards and adapted to have its inner end brought into frictional contact with the frame, and thus retain the same.

The cord carrying the counterbalance-weight (shown in Fig. 1 of the drawings) is connected with the lid for holding the same in an open position when so desired. I prefer to use different-sized discharge-chutes for filling different-sized sacks or receptacles, and also to have the chutes telescoped, the smaller one being removably secured in place in any suitable manner, and the others telescoping or arranged on the same, as will be readily understood. By this construction I am enabled to have the proper chute ready in an instant.

The operation is as follows: The material is placed in the hopper or receiver, and from there is passed to the conveyer-box. The conveyer is then rotated, carrying the material to the sifter and forcing it through the meshes thereof, thus removing any foreign matter from the material. After leaving the sifter it passes into the discharge-chute to the receptacle, which has been arranged on the platform before starting the machine. The packer moves from one side to the other of the discharge-chute, as shown in Figs. 3 and 4 of the drawings, and fills the receptacle evenly and smoothly at all points. As the receptacle becomes full it causes the platform to descend until the lug on the guard causes the sounding of the bell, which is a signal to the attendant or operator that the receptacle is filled. The filled receptacle is removed and an empty receptacle is now placed on the chute 13. The platform now rises and the operation is repeated, as before.

It will be understood that the gage may be adjusted by means of the scale or marks thereon for different-sized receptacles, and the case containing the weights is also made the proper weight.

It will thus be seen that I provide a machine of very simple and inexpensive construction, by means of which receptacles may be filled with rapidity, which is very easy to operate, and which can be made portable or stationary, of any desired dimensions, and operated by suitable power.

Another great advantage of my invention is that there is no dust made and no material wasted.

I would have it understood that I reserve the right to make minor changes in the arrangement of certain parts of the machine without departing from the scope or spirit or sacrificing any of the advantages of the invention.

Having thus described my invention, what I claim as new, and desire to secure by Letters Patent, is—

1. In a flour-packing machine, the combination of a hopper, a conveyer-box with a conveyer therein, and having in its discharge end a sifter or screen, a brush carried by the said conveyer and rotating against said screen, a packer connected with the conveyer-shaft, and a discharge-chute in which said packer operates, substantially as and for the purpose set forth.

2. In a flour-packing machine, a frame having a hopper with conveyer-box, a conveyer in said box, a screen at the discharge end of said box, a discharge-chute, a reciprocating packer in said discharge-chute, standards with pulleys connected therewith, cords connected to said frame and passing over said pulleys, and a box with weights therein secured to said cords, said parts being combined substantially as and for the purpose set forth.

3. In a flour-packing machine, the combination of the conveyer-box having a sifter or screen in the discharge end thereof, a discharge-chute communicating with said end, a conveyer arranged in the conveyer-box, and a packer on the conveyer-shaft arranged and operating in the discharge-chute, substantially in the manner and for the purpose described.

4. In a flour-packing machine, a conveyer-box with a rotary conveyer therein, a chamber at the end of said box, provided with a discharge-chute, a rising and falling packer connected to said conveyer in said chamber and operating in said discharge-chute, and a rising and falling frame, said parts being combined substantially as and for the purpose set forth.

5. In a flour-packing machine, the combination of the conveyer-box, a shield or guard arranged above said box, a conveyer in said box, a discharge-chute communicating with the conveyer-box, a packer on the shaft of the conveyer arranged in the discharge-chute, a frame carrying a platform arranged below the discharge-chute, a gage on the frame, and a bell adapted to be sounded by the gage, substantially in the manner and for the purpose described.

S. TICE AYRES.

Witnesses:
 WM. N. MOORE,
 JOHN A. WIEDERSHEIM.